United States Patent
Pan et al.

(10) Patent No.: US 9,887,632 B1
(45) Date of Patent: Feb. 6, 2018

(54) STEP-UP KP RIPPLE FREE CONVERTER

(71) Applicants: ALLIS ELECTRIC CO., LTD., Taipei (TW); Ching-Tsai Pan, Taipei (TW)

(72) Inventors: Ching-Tsai Pan, Taipei (TW); Ming-Chieh Cheng, Taipei (TW)

(73) Assignees: ALLIS ELECTRIC CO., LTD., Taipei (TW); Ching-Tsai Pan, Taipei (TW)

( * ) Notice: Subject to any disclaimer, the term of this patent is extended or adjusted under 35 U.S.C. 154(b) by 0 days.

(21) Appl. No.: 15/368,169

(22) Filed: Dec. 2, 2016

(51) Int. Cl.
*H02M 3/335* (2006.01)
*H02M 1/12* (2006.01)
*H02M 1/14* (2006.01)

(52) U.S. Cl.
CPC ......... *H02M 3/33546* (2013.01); *H02M 1/14* (2013.01)

(58) Field of Classification Search
CPC ............................ H02M 1/14; H02M 3/33553
USPC .............. 363/18–21.01, 21.02, 21.08, 40, 45
See application file for complete search history.

(56) References Cited

U.S. PATENT DOCUMENTS

| | | | | |
|---|---|---|---|---|
| 2006/0285368 A1* | 12/2006 | Schlecht | ............... | H02M 3/335 363/21.06 |
| 2013/0170266 A1* | 7/2013 | Pan | ......................... | H02M 7/48 363/131 |
| 2014/0056032 A1* | 2/2014 | Pan | .................... | H02M 3/33569 363/16 |
| 2014/0103899 A1* | 4/2014 | Chen | ....................... | H02M 1/14 323/311 |
| 2015/0280580 A1* | 10/2015 | Chen | ................. | H02M 3/33507 307/17 |
| 2015/0326105 A1* | 11/2015 | Pan | ........................ | H02M 1/143 363/21.12 |

* cited by examiner

*Primary Examiner* — Gary Nash
(74) *Attorney, Agent, or Firm* — Chun-Ming Shih; HDLS IPR Services (57) ABSTRACT

A step-up ripple free converter applied to achieve a characteristic of zero-ripple voltage, which ripple voltage is near zero, includes a ripple-regulating component, a power isolating and converting unit, a power switch, first to fourth capacitors, an auxiliary inductor, a first rectifying switch, and a second rectifying switch. The power isolating and converting unit is electrically connected to the ripple-filtering inductor, and includes a plurality of windings for separating the step-up ripple free converter into an input stage and an output stage. The power switch, the first capacitor, and the second capacitor are arranged at the input stage and are electrically connected to the power isolating and converting unit. The third capacitor, the fourth capacitor, the first rectifying switch, and the second rectifying switch are arranged at the output stage and are electrically connected to the power isolating and converting unit.

8 Claims, 5 Drawing Sheets

STEP-UP KP RIPPLE FREE CONVERTER

BACKGROUND

Technical Field

The present disclosure relates to a direct current converter. More particularly, the present disclosure relates to a step-up ripple free converter.

Description of Related Art

As the technology develops, electronic products, such as notebook, mobile device, and multimedia player, have become an indispensable means for people in their everydayness and business as well. In general, the electronic products are operated when providing with a suitable and normal electric power, thereby the electronic products may be suffered when the electric power applies abnormally.

The conventional step-up power converter is constituted by a controller, a switch component, a diode, and an energy-storage inductor; this gives the power converter has advantages of simple to make, compact, and effective cost, and is widely used in electronic products.

However, the power converter mentioned above produces a higher ripple voltage on its output, this may cause errors in load.

SUMMARY

The present disclosure is disclosed by the inventor in honor of the 100th birthday of his late father, Mr. Kung Pan.

According to one aspect of the present disclosure, a step-up ripple free converter for regulating electric power supplied from a power source to a load includes a power isolating and converting unit, a ripple-filtering inductor, a power switch, first to fourth capacitors, a first rectifying switch, a second rectifying switch, and an auxiliary inductor. The power isolating and converting unit includes a plurality of windings for isolation an input stage electrically connected to the power source from an output stage electrically connected to the load. The ripple-filtering inductor is arranged at the input stage, and the power switch is arranged at the input stage and electrically connected to the ripple-filtering inductor and the power isolating and converting unit. The first capacitor is arranged at the input stage and electrically connected to the power isolating and converting unit; the second capacitor is arranged at the input stage and electrically connected to the power isolating and converting unit; the third capacitor is arranged at the output stage and electrically connected to the power isolating and converting unit; the fourth capacitor is arranged at the output stage and electrically connected to the power isolating and converting unit. The first rectifying switch is arranged at the output stage and electrically connected to the power isolating and converting unit and the third capacitor, and the second rectifying switch is arranged at the output stage and electrically connected to the power isolating and converting unit and the fourth capacitor. The auxiliary inductor is electrically connected to the power isolating and converting unit. When the power switch is conducted, the ripple-filtering inductor and the auxiliary inductor divide the electric power supplied from the power source to smooth a ripple voltage at the output stage, and when the power switch is not conducted, the ripple-filtering inductor and the auxiliary inductor divide the electric power supplied from the power source to smooth a ripple voltage at the output stage.

According to another aspect of the present disclosure, a step-up ripple free converter for regulating electric power supplied from a power source to a load includes a power isolating and converting unit, a ripple-filtering inductor, a power switch, magnetizing inductor, an input stage first rectifying switch, an input stage second rectifying switch, and an output rectifying switch. The power isolating and converting unit includes a plurality of windings for isolation an input stage electrically connected to the power source from an output stage electrically connected to the load. The ripple-filtering inductor is arranged at the input stage and electrically connected to the power isolating and converting unit, the power switch is arranged at the input stage and electrically connected to the power isolating and converting unit and the ripple-filtering inductor, and the magnetizing inductor is arranged at the input stage and electrically connected to the power isolating and converting unit. The input stage first rectifying switch is arranged at the input stage and electrically connected to the power isolating and converting unit, the power switch, and the magnetizing inductor; the input stage second rectifying switch is arranged at the input stage and electrically connected to the power isolating and converting unit, the input stage first rectifying switch, and the magnetizing inductor; the output rectifying switch is arranged at the output stage and electrically connected to the power isolating and converting unit. When the power switch is conducted, the ripple-filtering inductor and the magnetizing inductor divide the electric power supplied from the power source to smooth a ripple voltage at the output stage, and when the power switch is not conducted, the ripple-filtering inductor and the magnetizing inductor divide the electric power supplied from the power source to smooth a ripple voltage at the output stage.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
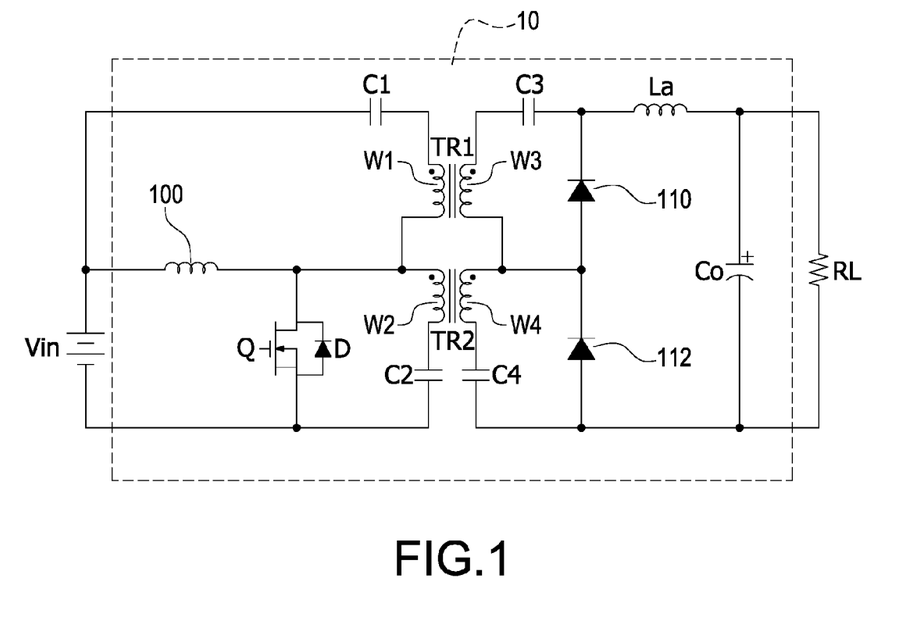
FIG. 1 is a circuit diagram of a step-up ripple free converter according to a 1st embodiment of the present disclosure.

Reference is made to FIG. 1, which is a circuit diagram of a step-up ripple free converter according to a 1st embodiment of the present disclosure. In FIG. 1, the step-up ripple free converter 10 is arranged between a power source Vin and a load RL and electrically connected thereto for regulating an electric power supplied from the power source Vin to the load RL. The step-up ripple free converter 10 includes a power isolating and converting unit (its reference numeral is omitted), a ripple-filtering inductor 100, a power switch Q, a first capacitor C1, a second capacitor C2, a third capacitor C3, a fourth capacitor C4, a first rectifying switch 110, a second rectifying switch 112, an auxiliary inductor La, and an output capacitor Co.

The step-up ripple free converter 10 further includes an input stage electrically connected to the power source Vin and an output stage electrically connected to the load RL. The power isolating and converting unit includes a plurality of windings. For example, the power isolating and converting unit shown in FIG. 1 includes a first winding W1, a second winding W2, a third winding W3, and a fourth winding W4. The first winding W1 and the second winding W2 are arranged at the input stage and electrically connected in series, and the third winding W3 and the fourth winding W4 are arranged at the output stage and electrically connected in series. The first winding W1 is magnetically coupled with the third winding W3, thus a first transformer TR1 is constituted; the second winding W2 is magnetically coupled with the fourth winding W4, thus a second transformer TR2 is constituted.

The first capacitor C1, the power switch Q, the ripple-free inductor 100, and the second capacitor C2 are arranged at the input stage; one terminal of the first capacitor C1 is connected to a positive terminal of the power source Vin, and the other terminal thereof is connected to the first winding W1 where the second winding W2 is not connected.

The power switch Q is, for example, an N-type metal-oxide-semiconductor field-effect transistor (MOSFET); the drain of the power switch Q is connected to a node between the first winding W1 and the second winding W2, the source thereof is connected to a negative terminal of the power source Vin and the terminal of the second capacitor C2 where the second winding W2 is not connected, and the gate thereof is connected to a controller (not shown) for receiving signals generates by the controller; the controller is configured to generate the signals to turn on/off the power switch Q. The step-up ripple free converter 10 may further includes a diode D electrically connected to the power switch Q. Specifically, the cathode of the diode D is connected to the drain of the power switch Q, and the anode thereof is connected to the source of the power switch Q; the diode D is, for example, the body diode of the power switch Q.

One terminal of the ripple-filtering inductor 100 is connected to the positive terminal of the power source Vin, and the other terminal of the ripple-filtering inductor 100 is connected to the drain of the power switch Q and the node between the first winding W1 and the second winding W2.

One terminal of the second capacitor C2 is connected to the second winding W2 where the first winding W1 is not connected, and the other terminal is connected to the negative terminal of the power source Vin and the source of the power switch Q.

The third capacitor C3, the fourth capacitor C4, the first rectifying switch 110, the second rectifying switch 112, the auxiliary inductor La, and the output capacitor Co are arranged at the output stage. The first rectifying switch 110 and the second rectifying switch 112 are, for example, diodes. One terminal of the third capacitor C3 is connected to the third winding W3 where the fourth winding W4 is not connected, and the other terminal of the third capacitor C3 is connected to the cathode of the first rectifying switch 110 and one terminal of the auxiliary inductor La. One terminal of the fourth capacitor C4 is connected to the fourth winding W4 where the third winding W3 is not connected, and the other terminal of the fourth capacitor C4 is connected to the anode of the second rectifying switch 112, the output capacitor Co, and the load RL. The anode of the first rectifying switch 110 is connected to the cathode of the second rectifying switch 112 and a node between the third winding W3 and the fourth winding W4. The other terminal of the auxiliary inductor La where the third capacitor C3 and the cathode of the first rectifying switch 110 are not connected is connected to a positive terminal of the output capacitor Co and the load RL. The output capacitor Co and the load RL are electrically connected in parallel.

Figure 2:
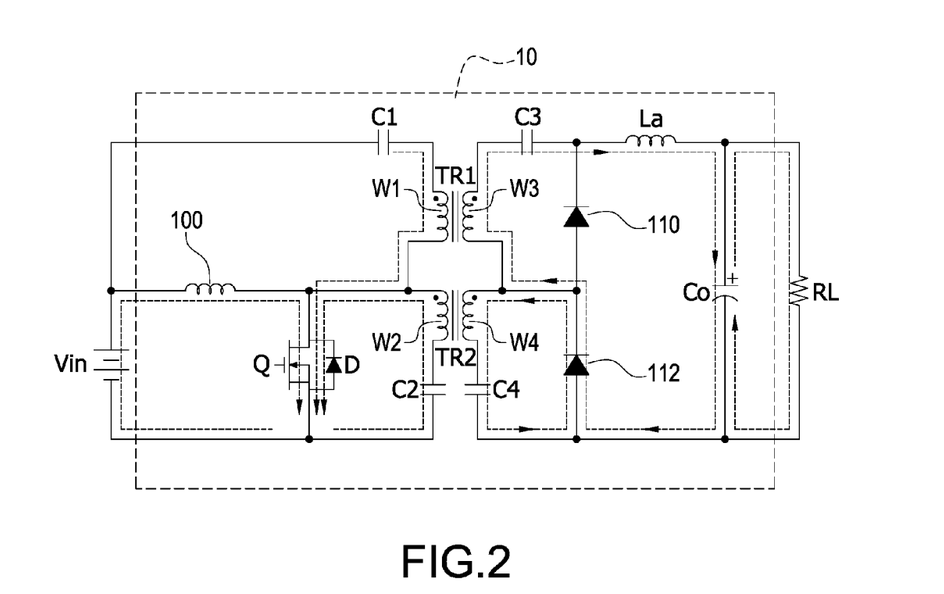
FIG. 2 is an equivalent diagram of the step-up ripple free converter under a 1st operation mode according to the 1st embodiment of the present disclosure.

Reference is made to FIG. 2, which is an equivalent diagram of the step-up ripple free converter under a 1st operation mode according to the 1st embodiment of the present disclosure. When the step-up ripple free converter 10 is under the 1st operation mode, the power switch Q is conducted, the first rectifying switch 110 turns off, and the second rectifying switch 112 turns on, this gives the electric power supplied from the power source Vin to be divided into three power flow paths at the input stage; one of the power flow paths is established in the power source Vin, the ripple-filtering inductor 100, and the power switch Q, another power flow path is established in the first capacitor C1, the first winding W1, and the power switch Q, and the other power flow path is established in the second winding W2, the power switch Q, and the second capacitor C2. Therefore, the electric power supplied from the power source Vin is conducted to the first winding W1 and the second winding W2, and can be magnetically coupled to the third winding W3 and the fourth winding W4 arranged at the output stage.

The electric power magnetically coupled to the output stage is divided into two power flow paths; one of the power flow paths is established in the third winding W3, the third capacitor C3, the auxiliary winding La, the output capacitor Co, and the second rectifying switch 112, and the other power flow path is established in the fourth winding W4, the fourth capacitor C4, and the second rectifying switch 112. The output capacitor Co provides the electric power to the load RL. The ripple-filtering inductor 100 and the auxiliary inductor La divide the electric power supplied from the power source Vin to smooth the ripple voltage at the output stage.

Figure 3:
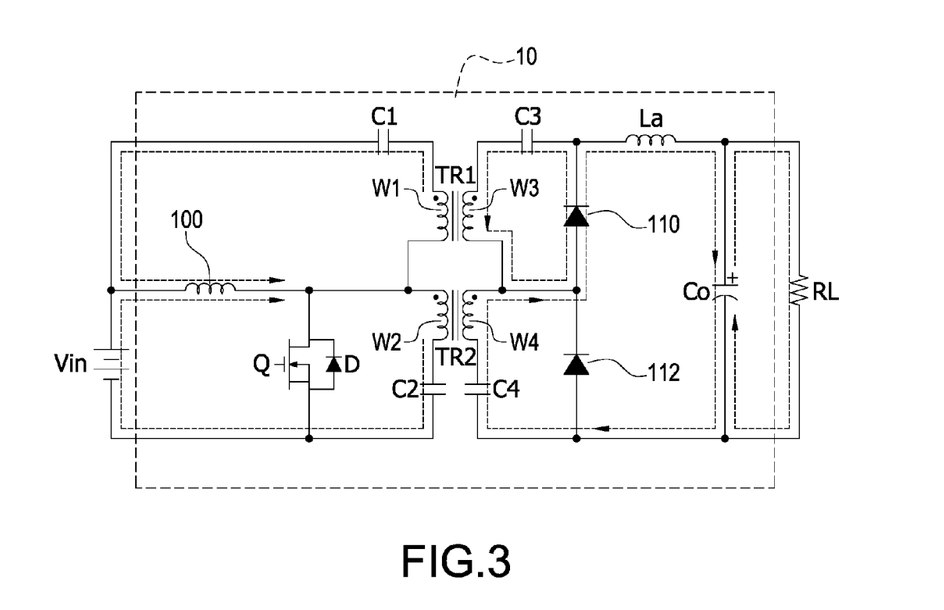
FIG. 3 is an equivalent diagram of the step-up ripple free converter under a 2nd operation mode according to the 1st embodiment of the present disclosure.

Reference is made to FIG. 3, which is an equivalent diagram of the step-up ripple free converter under a 2nd operation mode according to the 1st embodiment of the present disclosure. When the step-up ripple free converter 10 is under the 2nd operation mode, the power switch Q is not conducted, the first rectifying switch 110 turns on, and the second rectifying switch 112 turns off, this gives the electric power supplied from the power source Vin to be divided into two power flow paths at the input stage; one of the power flow paths is established in the power source Vin, the ripple-filtering inductor 100, the second winding W2, and the second capacitor C2, and the other power flow path is established in the first capacitor C1, the ripple-filtering capacitor 100, and the first winding W1. Therefore, the electric power supplied from the power source Vin is conducted to the first winding W1 and the second winding W2, and can be magnetically coupled to the third winding W3 and the fourth winding W4 arranged at the output stage.

The electric power coupled to the output stage is also divided into two power flow paths; one of the power flow paths is established in the third winding W3, the first rectifying switch 110, and the third capacitor C3, and the other power flow path is established in the fourth winding W4, the first rectifying switch 110, the auxiliary inductor La, the output capacitor Co, and the fourth capacitor C4. The output capacitor Co provides the electric power to the load RL. The ripple-filtering inductor 100 and the auxiliary inductor La divide the electric power supplied from the power source Vin to smooth the ripple voltage at the output stage.

Figure 4:
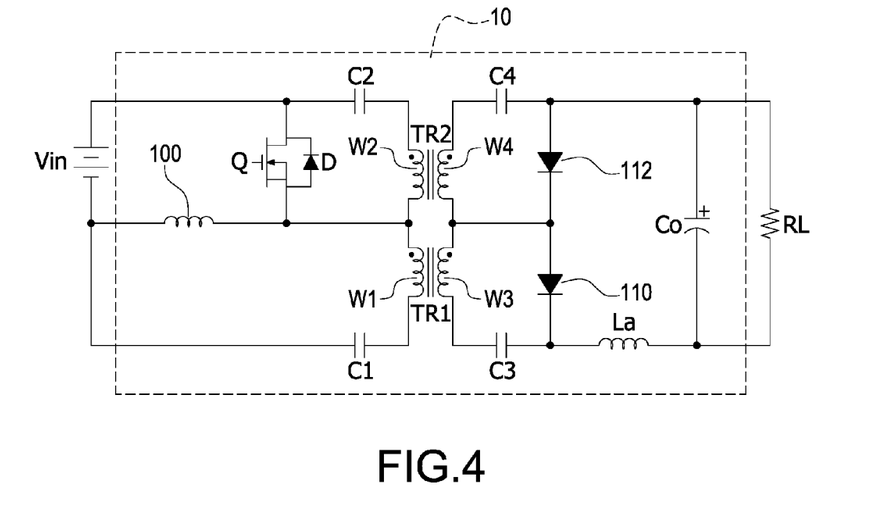
FIG. 4 is a circuit diagram of a step-up ripple free converter according to a 2nd embodiment of the present disclosure.

Reference is made to FIG. 4, which is a circuit diagram of a step-up ripple free converter according to a 2nd embodiment of the present disclosure. In FIG. 4, the step-up ripple free converter 10 is arranged between a power source Vin and a load RL and electrically connected thereto for regulating an electric power supplied from the power source Vin to the load RL. The step-up ripple free converter 10 includes a power isolating and converting unit (its reference numeral is omitted), a ripple-filtering inductor 100, a power switch Q, a first capacitor C1, a second capacitor C2, a third capacitor C3, a fourth capacitor C4, a first rectifying switch 110, a second rectifying switch 112, an auxiliary inductor La, and an output capacitor Co.

The step-up ripple free converter 10 further includes an input stage electrically connected to the power source Vin and an output stage electrically connected to the load RL. The power isolating and converting unit includes a plurality of windings. For example, the power isolating and converting unit shown in FIG. 4 includes a first winding W1, a second winding W2, a third winding W3, and a fourth winding W4. The first winding W1 and the second winding W2 are arranged at the input stage and electrically connected in series, and the third winding W3 and the fourth winding W4 are arranged at the output stage and electrically connected in series. The first winding W1 is magnetically coupled with the third winding W3, thus a first transformer TR1 is constituted; the second winding W2 is magnetically coupled with the fourth winding W4, thus a second transformer TR2 is constituted.

The first capacitor C1, the second capacitor C2, the power switch Q, and the ripple-free inductor 100 are arranged at the input stage; one terminal of the first capacitor C1 is connected to a negative terminal of the power source Vin, and the other terminal thereof is connected to the first winding W1 where the second winding W2 is not connected.

The power switch Q is, for example, an N-type MOSFET; the drain of the power switch Q is connected to a positive terminal of the power source Vin and one terminal of the second capacitor C2 where the second winding W2 is not connected, the source thereof is connected to one terminal of the ripple-filtering inductor 100, and a node between the first winding W1 and the second winding W2. The step-up ripple free converter 10 may further includes a diode D electrically connected to the power switch Q. Specifically, the cathode of the diode D is connected to the drain of the power switch Q, and the anode thereof is connected to the source of the power switch Q; the diode D is, for example, the body diode of the power switch Q.

The other terminal of the ripple-filtering inductor 100 where the source of the power switch Q is not connected is connected to the negative terminal of the power source Vin and the terminal of the first capacitor C1 where the first winding W1 is not connected. One terminal of the second capacitor C2 is connected to the positive terminal of the power source Vin, and the other terminal thereof is connected to the terminal of the second winding W2 where the first winding W1 is not connected.

The first rectifying switch 110, the second rectifying switch 112, the third capacitor C3, the fourth capacitor C4, the auxiliary inductor La, and the output capacitor Co are arranged at the output stage. The first rectifying switch 110 and the second rectifying switch 112 are, for example, diodes. One terminal of the third capacitor C3 is connected to the third winding W3 where the fourth winding W4 is not connected, and the other terminal of the third capacitor C3 is connected to the cathode of the first rectifying switch 110 and one terminal of the auxiliary inductor La. One terminal of the fourth capacitor C4 is connected to the fourth winding W4 where the third winding W3 is not connected, and the other terminal of the fourth capacitor C4 is connected to the anode of the second rectifying switch 112, and the positive terminal of the output capacitor Co. The anode of the first rectifying switch 110 is connected to a node between the third winding W3 and the fourth winding W4, and the cathode thereof is connected to the third capacitor C3 and the auxiliary inductor La. The cathode of the second rectifying switch 112 is connected to the node between the third winding W3 and the fourth winding W4. The terminal of the auxiliary inductor La where the third capacitor C3 and the first rectifying switch 110 are not connected is connected to the output capacitor Co and the load RL. The output capacitor Co and the load RL are electrically connected in parallel. The step-up ripple free converter 10 shown in the FIG. 4 can achieve the functions as the step-up ripple free converter 10 shown in FIG. 1 mentioned above does and is not repeated here for brevity.

Figure 5:
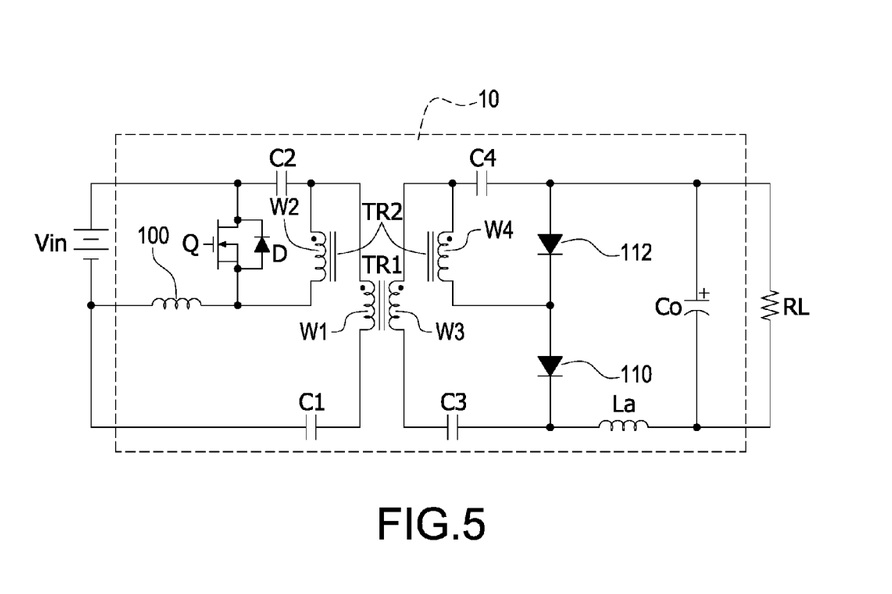
FIG. 5 is a circuit diagram of a step-up ripple free converter according to a 3rd embodiment of the present disclosure.

Reference is made to FIG. 5, which is a circuit diagram of a step-up ripple free converter according to a 3rd embodiment of the present disclosure. In FIG. 5, the step-up ripple free converter 10 is arranged between a power source Vin and a load RL and electrically connected thereto for regulating an electric power supplied from the power source Vin to the load RL. The step-up ripple free converter 10 includes a power isolating and converting unit (its reference numeral is omitted), a ripple-filtering inductor 100, a power switch Q, a first capacitor C1, a second capacitor C2, a third capacitor C3, a fourth capacitor C4, a first rectifying switch 110, a second rectifying switch 112, an auxiliary inductor La, and an output capacitor Co.

The step-up ripple free converter 10 further includes an input stage electrically connected to the power source Vin and an output stage electrically connected to the load RL. The power isolating and converting unit includes a plurality of windings. For example, the power isolating and converting unit shown in FIG. 5 includes a first winding W1, a second winding W2, a third winding W3, and a fourth winding W4. The first winding W1 and the second winding W2 are arranged at the input stage and electrically connected in series, and the third winding W3 and the fourth winding W4 are arranged at the output stage and electrically connected in series. The first winding W1 is magnetically coupled with the third winding W3, thus a first transformer TR1 is constituted; the second winding W2 is magnetically coupled with the fourth winding W4, thus a second transformer TR2 is constituted.

The first capacitor C1, the power switch Q, the ripple-free inductor 100, and the second capacitor C2 are arranged at the input stage; one terminal of the first winding W1 and one terminal of the second winding W2 are electrically connected to a positive terminal of the power source Vin via the second capacitor C2; the other terminal of the first winding W1 is electrically connected to the negative terminal of the power source Vin via the first capacitor C1, and the other terminal of the second winding W2 is electrically connected to a negative terminal of the power source Vin via the ripple-filtering inductor 100.

The power switch Q is, for example, an N-type MOSFET; the drain of the power switch Q is connected to the positive terminal of the power source Vin, and the source thereof is electrically connected to the negative terminal of the power source Vin via the ripple-filtering inductor 100. The step-up ripple free converter 10 may further includes a diode D electrically connected to the power switch Q. Specifically, the cathode of the diode D is connected to the drain of the power switch Q, and the anode thereof is connected to the source of the power switch Q; the diode D is, for example, the body diode of the power switch Q The first rectifying switch 110, the second rectifying switch 112, the third capacitor C3, the fourth capacitor C4, the auxiliary inductor La, and the output capacitor Co are arranged at the output stage. The first rectifying switch 110 and the second rectifying switch 112 are, for example, diodes. The output capacitor Co is electrically connected to the load RL in parallel. One terminal of the third winding W3 and one terminal of the fourth winding W4 are electrically connected to (a positive terminal of) the output capacitor Co, the other terminal of the third winding W3 is electrically connected to (a negative terminal of) the output capacitor Co via the third capacitor C3 and the auxiliary inductor La, and the other terminal of the fourth winding W4 is connected to a node between the anode of the first rectifying switch 110 and the cathode of the second rectifying switch 112. The anode of the second rectifying switch 112 is connected to a node between the fourth capacitor C4 and the positive terminal of the output capacitor Co; the cathode of the first rectifying switch 110 is connected to a node between the third capacitor C3 and the auxiliary inductor La. The step-up ripple free converter 10 shown in the FIG. 5 can achieve the functions as the step-up ripple free converter 10 shown in FIG. 1 mentioned above does and is not repeated here for brevity.

Figure 6:
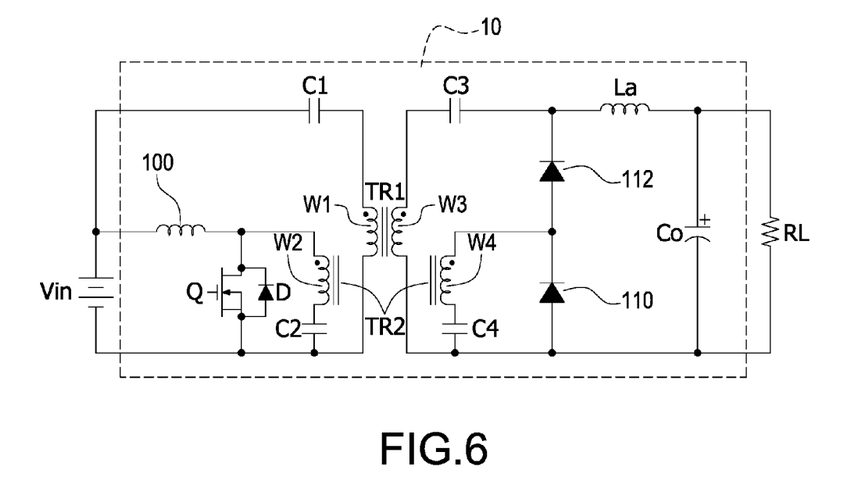
FIG. 6 is a circuit diagram of a step-up ripple free converter according to a 4th embodiment of the present disclosure.

Reference is made to FIG. 6, which is a circuit diagram of a step-up ripple free converter according to a 4th embodiment of the present disclosure. In FIG. 6, the step-up ripple free converter 10 is arranged between a power source Vin and a load RL and electrically connected thereto for regulating an electric power supplied from the power source Vin to the load RL. The step-up ripple free converter 10 includes a power isolating and converting unit (its reference numeral is omitted), a ripple-filtering inductor 100, a power switch Q, a first capacitor C1, a second capacitor C2, a third capacitor C3, a fourth capacitor C4, a first rectifying switch 110, a second rectifying switch 112, an auxiliary inductor La, and an output capacitor Co.

The step-up ripple free converter 10 further includes an input stage electrically connected to the power source Vin and an output stage electrically connected to the load RL. The power isolating and converting unit includes a plurality of windings. For example, the power isolating and converting unit shown in FIG. 6 includes a first winding W1, a second winding W2, a third winding W3, and a fourth winding W4. The first winding W1 and the second winding W2 are arranged at the input, and the third winding W3 and the fourth winding W4 are arranged at the output. The first winding W1 is magnetically coupled with the third winding W3, thus a first transformer TR1 is constituted; the second winding W2 is magnetically coupled with the fourth winding W4, thus a second transformer TR2 is constituted.

The first capacitor C1, the power switch Q, the ripple-free inductor 100, and the second capacitor C2 are arranged at the input stage. One terminal thereof is electrically connected to a positive terminal of the power source Vin via the first capacitor C1, and the other terminal of the first winding W1 is connected to a negative terminal of the power source Vin. One terminal of the second winding W2 is electrically connected to the positive terminal of the power source Vin via the ripple-filtering inductor 100, and the other terminal thereof is electrically connected to the negative terminal of the power source Vin via the second capacitor C2.

The power switch Q is, for example, an N-type MOSFET; the drain of the power switch Q is connected to the positive terminal of the power source Vin via the ripple-filtering inductor 100, and the source thereof is connected to the negative terminal of the power source Vin. The step-up ripple free converter 10 may further includes a diode D electrically connected to the power switch Q. Specifically, the cathode of the diode D is connected to the drain of the power switch Q, and the anode thereof is connected to the source of the power switch Q; the diode D is, for example, the body diode of the power switch Q.

The first rectifying switch 110, the second rectifying switch 112, the third capacitor C3, the fourth capacitor C4, the auxiliary inductor La, and the output capacitor Co are arranged at the output stage. One terminal of the third winding W3 is electrically connected to (a positive terminal of) the output capacitor Co via the third capacitor C3 and the auxiliary inductor La, and the other terminal thereof is connected to (a negative terminal of) the output capacitor Co. The output capacitor Co is electrically connected to the load RL in parallel.

The first rectifying switch 110 and the second rectifying switch 112 are, for example, diodes. The cathode of the first rectifying switch 110 is connected to anode of the second rectifying switch 112, and the anode of the first rectifying switch 110 is connected to the third winding W3 where (the negative terminal of) the output capacitor Co is connected; the cathode of the second rectifying switch 112 is connected to a node between the third capacitor C3 and the auxiliary inductor La.

One terminal of the fourth winding W4 is connected to the cathode of the first rectifying switch 110 and the anode of the second rectifying switch 112, and the other terminal of the fourth winding W4 is connected to the third winding W3 where the negative terminal of the output capacitor Co is connected. The step-up ripple free converter 10 shown in the FIG. 6 can achieve the functions as the step-up ripple free converter 10 shown in FIG. 1 mentioned above does and is not repeated here for brevity.

Figure 7:
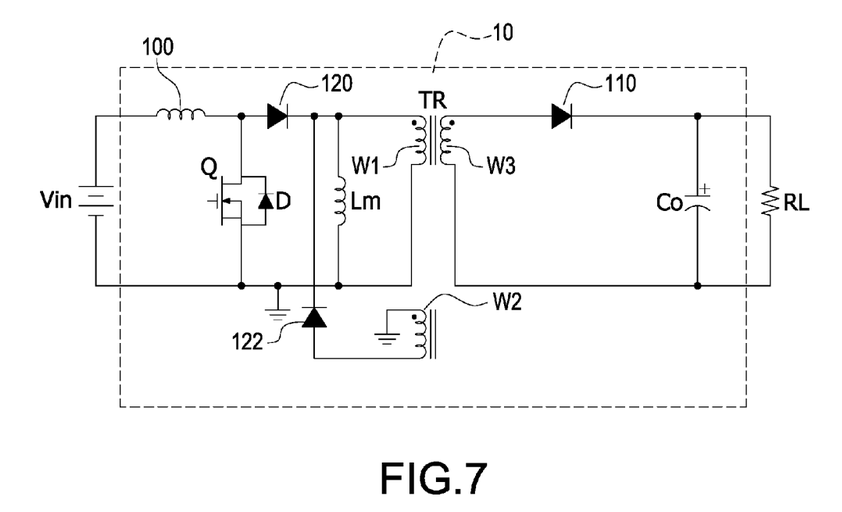
FIG. 7 is a circuit diagram of a step-up ripple free converter according to a 5th embodiment of the present disclosure.

Reference is made to FIG. 7, which is a circuit diagram of a step-up ripple free converter according to a 5th embodiment of the present disclosure. In FIG. 7, the step-up ripple free converter 10 is arranged between a power source Vin and a load RL and electrically connected thereto for regulating an electric power supplied from the power source Vin to the load RL. The step-up ripple free converter 10 includes a power isolating and converting unit (its reference numeral is omitted), a ripple-filtering inductor 100, a power switch Q, an input stage rectifying switch 120, an input stage second rectifying switch 122, an output stage rectifying switch 110, a magnetizing inductor Lm, and an output capacitor Co.

The step-up ripple free converter 10 further includes an input stage electrically connected to the power source Vin and an output stage electrically connected to the load RL. The power isolating and converting unit includes a plurality of windings. For example, the power isolating and converting unit shown in FIG. 7 includes a first winding W1, a second winding W2, and a third winding W3. The first winding W1 and the second winding W2 are arranged at the input stage, and the third winding W3 is arranged at the output stage. The first winding W1, the second winding W2 and the third winding W3 constitute a transformer TR.

The ripple-free inductor 100, the power switch Q, the input stage first rectifying switch 122, the input stage second rectifying switch 122, and the magnetizing inductor Lm are arranged at the input stage. The power switch Q is, for example, an N-type MOSFET. The step-up ripple free converter 10 may further includes a diode D electrically connected to the power switch Q. Specifically, the cathode of the diode D is connected to the drain of the power switch Q, and the anode thereof is connected to the source of the power switch Q; the diode D is, for example, the body diode of the power switch Q.

The input stage first rectifying switch 120 and the input stage second rectifying switch 122 are, for example, diodes. One terminal of the first winding W1 is connected to the cathode of the input stage first rectifying switch 120 and the cathode of the input stage second rectifying switch 122, and the other terminal thereof is connected to the negative terminal of the power source Vin. The anode of the input stage first rectifying switch 120 is electrically connected to a positive terminal of the power source Vin via the ripple-filtering inductor 100. One terminal of the second winding W2 is connected to the negative terminal of the power source Vin, and the other terminal thereof is electrically connected to the anode of the input stage second rectifying switch 122. The drain of the power switch Q is connected to the anode of the input stage first rectifying switch 120, and the source thereof is connected to the negative terminal of the power source Vin. The magnetizing inductor Lm is electrically connected to the first winding W1 in parallel.

The output stage rectifying switch 110 and the output capacitor Co are arranged at the output stage. The output stage rectifying switch 110 is, for example, a diode. One terminal of the third winding W3 is connected to the anode of the output stage rectifying switch 110, and the cathode of the output stage rectifying switch 110 is connected to (a positive terminal of) the output capacitor Co; the other terminal of the third winding W3 is connected to (a negative terminal of) the output capacitor Co. The output capacitor Co and the load RL are electrically connected in parallel.

Figure 8:
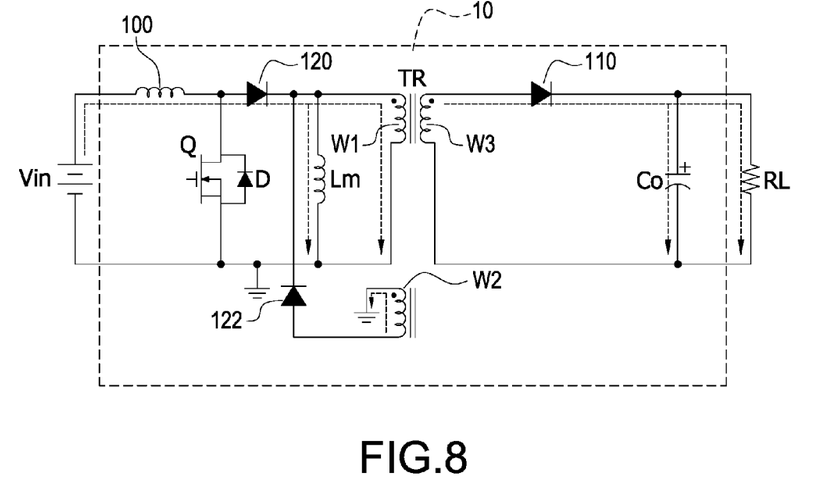
FIG. 8 is an equivalent diagram of the step-up ripple free converter under a 1st operation mode according to the 5th embodiment of the present disclosure.

Reference is made to FIG. 8, which is an equivalent diagram of the step-up ripple free converter under a 1st operation mode according to the 5th embodiment of the present disclosure. When the step-up ripple free converter 10 is under the 1st operation mode, the power switch Q is not conducted and the first rectifying switch 110 turns on, this gives the electric power supplied from the power source Vin to be divided into two power flow paths at the input stage. One of the power flow paths is established in the power source Vin, the ripple-filtering inductor 100, the input stage first rectifying switch 120, the magnetizing inductor Lm, and the first winding W1, and the other power flow path is established in the second winding W2 and the negative terminal of the power source Vin.

The electric power magnetically coupled to the output stage establishes single power flow path in the third winding W3 and the first rectifying switch 110, and is then conducted to the output capacitor Co and the load RL. The ripple-filtering inductor 100 and the magnetizing inductor Lm divide the electric power supplied from the power source Vin to smooth the ripple voltage at the output stage.

Figure 9:
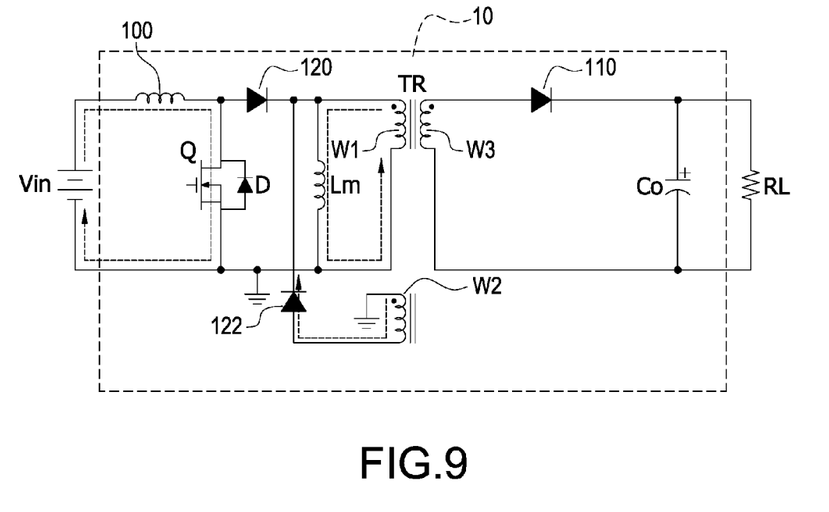
FIG. 9 is an equivalent diagram of the step-up ripple free converter under a 2nd operation mode according to the 5th embodiment of the present disclosure.

Reference is made to FIG. 9, which is an equivalent diagram of the step-up ripple free converter under a 2nd operation mode according to the 5th embodiment of the present disclosure. When the step-up ripple free converter 10 is under the 2nd operation mode, the power switch Q is conducted, the first rectifying switch 110 turns off, this gives the no current flowing through the load RL and the electric power supplied from the power source Vin to be divided into three power flow paths at the input stage. One of the power flow paths is established in the power source Vin, the ripple-filtering inductor 100, and the power switch Q, another power flow path is established in the second winding W2 and the input stage second rectifying switch 122, and the other power flow path is established in the first winding W1 and the magnetizing inductor Lm. Thus the ripple-filtering inductor 100 and the magnetizing inductor Lm divide the electric power supplied from the power source Vin to smooth the ripple voltage at the output stage.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the disclosure as defined in the appended claims.

What is claimed is:

1. A step-up ripple free converter for regulating electric power supplied from a power source to a load, the step-up ripple free converter comprising:
    a power isolating and converting unit comprising a plurality of windings for isolation an input stage electrically connected to the power source from an output stage electrically connected to the load;
    a ripple-filtering inductor arranged at the input stage;
    a power switch arranged at the input stage and electrically connected to the ripple-filtering inductor and the power isolating and converting unit;
    a first capacitor arranged at the input stage and electrically connected to the power isolating and converting unit;
    a second capacitor arranged at the input stage and electrically connected to the power isolating and converting unit;
    a third capacitor arranged at the output stage and electrically connected to the power isolating and converting unit;
    a fourth capacitor arranged at the output stage and electrically connected to the power isolating and converting unit;
    a first rectifying switch arranged at the output stage and electrically connected to the power isolating and converting unit and the third capacitor;
    a second rectifying switch arranged at the output stage and electrically connected to the power isolating and converting unit and the fourth capacitor; and
    an auxiliary inductor electrically connected to the power isolating and converting unit,
    wherein when the power switch is conducted, the ripple-filtering inductor and the auxiliary inductor divide the electric power supplied from the power source to smooth a ripple voltage at the output stage, and when the power switch is not conducted, the ripple-filtering inductor and the auxiliary inductor divide the electric power supplied from the power source to smooth a ripple voltage at the output stage.

2. The step-up ripple free converter in claim 1, wherein the windings collectively constitute two transformers.

3. The step-up ripple free converter in claim 2, wherein one terminal of one of the windings arranged at the input stage is electrically connected to the first capacitor, and the other terminal of the one of the winding is electrically connected to the power switch and the ripple-filtering capacitor, one terminal of the other winding arranged at the input stage is electrically connected to the power switch and the ripple-filtering capacitor, and the other terminal of the other winding arranged at the input stage is electrically connected to the second capacitor; and one terminal of one of the windings arranged at the output stage is electrically connected to the auxiliary inductor via the third capacitor, and the other terminal of the one of the windings is electrically connected to the first rectifying switch and the second rectifying switch, one terminal of the other winding arranged at the output stage is electrically connected to the first rectifying switch and the second rectifying switch, and the other terminal of the other winding arranged at the output stage is electrically connected to the fourth capacitor, the first rectifying switch, and the second rectifying switch.

4. The step-up ripple free converter in claim 2, wherein the windings arranged at the input stage are electrically connected in series, and the windings arranged at the output stage are electrically connected in series.

5. The step-up ripple free converter in claim 4, wherein a node between the windings arranged at the input stage is electrically connected to the ripple-filtering inductor and the power switch, and one terminal of the one of the windings at the input stage is electrically connected to the first capacitor; and a node between the windings arranged at the output stage is electrically connected to the first rectifying switch and the second rectifying switch, and one terminal of the one of the windings arranged at the output stage is electrically connected to the auxiliary inductor via the third capacitor, and the other terminal of the other winding arranged at the output stage is electrically connected to the second rectifying switch via the fourth capacitor.

6. A step-up ripple free converter for regulating electric power supplied from a power source to a load, the step-up ripple free converter comprising:

a power isolating and converting unit comprising a plurality of windings for isolation an input stage electrically connected to the power source from an output stage electrically connected to the load;

a ripple-filtering inductor arranged at the input stage and electrically connected to the power isolating and converting unit;

a power switch arranged at the input stage and electrically connected to the power isolating and converting unit and the ripple-filtering inductor;

a magnetizing inductor arranged at the input stage and electrically connected to the power isolating and converting unit;

an input stage first rectifying switch arranged at the input stage and electrically connected to the power isolating and converting unit, the power switch, and the magnetizing inductor;

an input stage second rectifying switch arranged at the input stage and electrically connected to the power isolating and converting unit, the input stage first rectifying switch, and the magnetizing inductor; and an output rectifying switch arranged at the output stage and electrically connected to the power isolating and converting unit, wherein when the power switch is conducted, the ripple-filtering inductor and the magnetizing inductor divide the electric power supplied from the power source to smooth a ripple voltage at the output stage, and when the power switch is not conducted, the ripple-filtering inductor and the magnetizing inductor divide the electric power supplied from the power source to smooth a ripple voltage at the output stage.

7. The step-up ripple free converter in claim 6, further comprising an output capacitor electrically connected to the output rectifying switch and the load.

8. The step-up ripple free converter in claim 6, wherein the power isolating and converting unit comprising three windings, two of the windings are arranged at the input stage, one of the windings arranged at the input stage is electrically connected to the magnetizing inductor in parallel, and the other winding arranged at the input stage is electrically connected to the input stage second rectifying switch in series.

* * * * *